United States Patent [19]

Lindsay

[11] 4,342,461
[45] Aug. 3, 1982

[54] ROTATING SHAFT SEAL ASSEMBLY

[76] Inventor: Joseph Lindsay, 1821 Lacey St., Apt. D, Bakersfield, Calif. 93309

[21] Appl. No.: 257,211

[22] Filed: Apr. 24, 1981

[51] Int. Cl.³ .................... F16J 15/16; F16J 15/54
[52] U.S. Cl. ..................................... 277/30; 277/35; 277/88
[58] Field of Search ................ 277/35, 30, 36, 42, 277/43, 47-49, 81 R, 82-90

[56] References Cited

U.S. PATENT DOCUMENTS

| 2,000,341 | 5/1935 | Larsh | 277/90 |
| 3,020,052 | 2/1962 | Gits | 277/89 |
| 3,582,091 | 6/1971 | Smith | 277/83 |
| 3,972,536 | 8/1976 | Warner et al. | 277/83 |

FOREIGN PATENT DOCUMENTS

| 144296 | 11/1951 | Australia | 277/90 |
| 281207 | 12/1927 | United Kingdom | 277/90 |
| 296971 | 9/1928 | United Kingdom | 277/30 |
| 1036445 | 7/1966 | United Kingdom | 277/90 |

Primary Examiner—Robert S. Ward, Jr.
Attorney, Agent, or Firm—Blakely, Sokoloff, Taylor & Zafman

[57] ABSTRACT

A seal assembly for sealing a rotary shaft including a rotary sealing cartridge and a stationary sealing cartridge and a flexible metal diaphragm secured to the face of the stuffing box. The stationary sealing cartridge is secured onto the flexible diaphragm and thus becomes self-aligning with the sealing surface of the rotary sealing cartridge eliminating a common source of leakage caused by misalignment of the surfaces. The use of the diaphragm permits elimination of the usual multitude of springs and O-rings used to achieve self-alignment, and permits the seal assembly to accommodate fluids at higher temperatures, as well as caustic fluids.

10 Claims, 5 Drawing Figures

ROTATING SHAFT SEAL ASSEMBLY

PRIOR ART STATEMENT

Applicant submits this prior art statement in conformance with rule 1.98. The most pertinent prior art of which applicant is aware comprises the following U.S. patents, a copy of which is enclosed.

| U.S. Pat. No. | Patentee | Issue Year |
| --- | --- | --- |
| 3,972,536 | Warner, et al. | August 3, 1976 |
| 3,020,052 | Gits | February 6, 1962 |

Warner is pertinent for showing one method of achieving self alignment between a stationary seal cartridge affixed to a pump stuffing box face and the rotary seal cartridge rotating with the shaft. Other methods and configurations are as shown in the Chesterton Seals advertising pamphlet (copy enclosed) at pages 4 through 9 particularly.

Gits is included because it is referred to in the Warner patent at column 1 lines 13 to 18 as showing the attachment of a stationary portion of a shaft sealing assembly to the housing through a resilient backing.

SUMMARY OF THE INVENTION

The invention compries a seal assembly for sealing around a rotating shaft which projects through an opening in a housing containing a fluid. A flexible metal diaphragm is provided for mounting over the housing stuffing box which thus provides the stationary sealing cartridge with a suspension means which permits the stationary sealing cartridge to self align with the rotary sealing cartridge to effect proper sealing and minimal wear. This self alignment compensates for the common misalignment between the stuffing box face and the axis of the shaft, which should be perpendicular to one another. This method and device for achieving self alignment eliminates the need to use a number of springs and O-rings as taught in the prior art. That, plus the fact that the seal assembly is an outside seal assembly (i.e., located outside of the housing containing the fluid) allows the seal to accomodate fluids of higher temperature as well as caustic fluids. In the present seal assembly there are no springs or O-rings to be deteriorated or gummed up and jammed by the hot or caustic fluids.

DETAILED DESCRIPTION OF THE INVENTION

Figure 1:
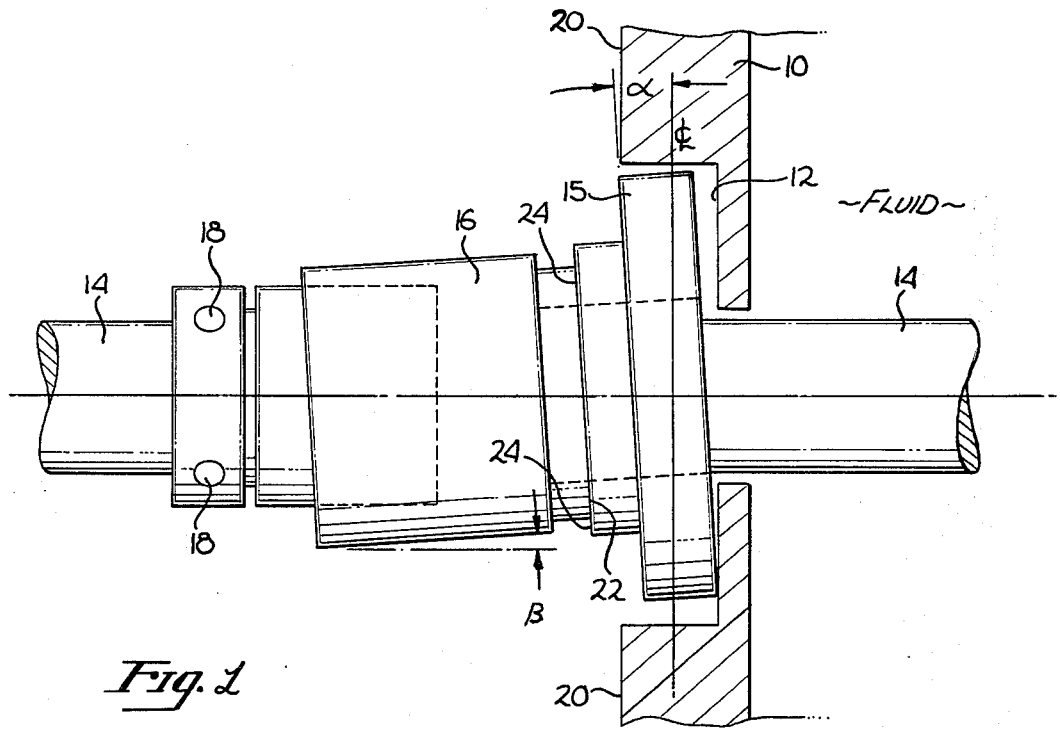
FIG. 1 illustrates a prior art mechanical seal with the stationary seal cartridge misaligned with the face of the stuffing box.

When a rotating shaft extends to the interior of a container holding a fluid, it is necessary to provide a seal assembly to prevent the fluid from leaving the container along the rotating shaft. A specific example of such a situation would be the penetration by a drive shaft to the interior of a pump housing as shown in FIG. 1. Not all of the pump is shown in the Figure, only that part of the pump housing 10 known as the stuffing box face 20 is shown. The interior of the pump would be to the right hand side of the housing 10 as seen in FIG. 1. An annular recess known as a stuffing box 12 is provided on the exterior side of housing 10 in the region immediately surrounding the shaft 14. The stuffing box 12 receives a stationary (i.e., rotationally stationary with respect to the housing 10) sealing cartridge 15 which cooperates with a rotating sealing cartridge 16 to prevent fluid from leaking out of the pump. The rotating sealing cartridge 16 is fixed for rotation with the shaft 14 such as by set screw 18 in FIG. 1.

Figure 2:
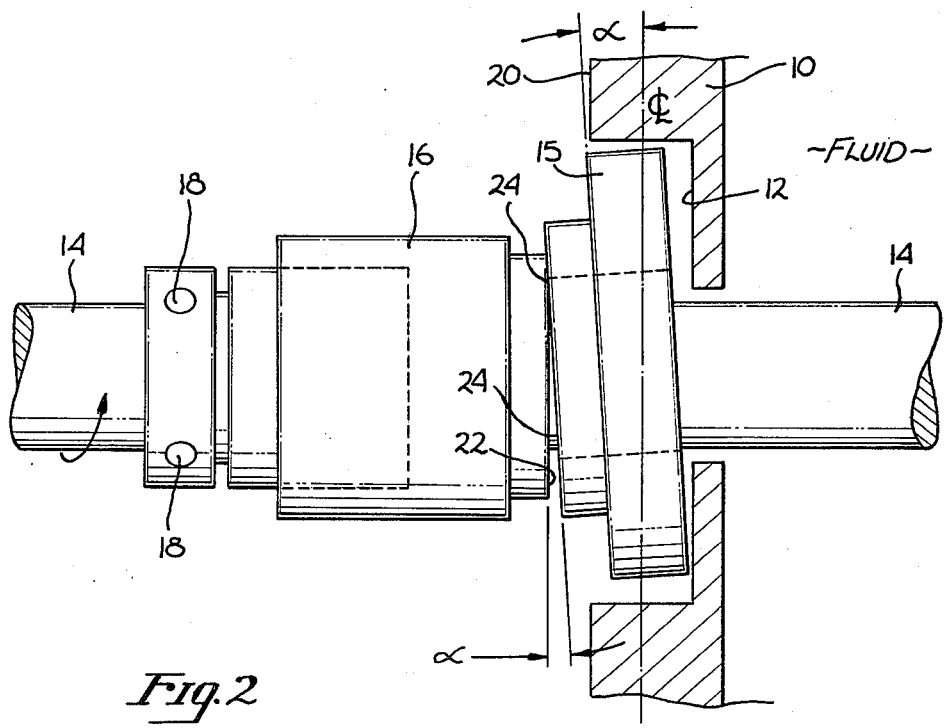
FIG. 2 shows the gap in the sealing engagement between the stationary seal cartridge and the rotary seal cartridge resulting from the misalignment.

In such a seal assembly, one of the most common causes of leakage is misalignment between the stationary sealing cartridge 15 and the face 20 of the stuffing box 12. Such misalignment is frequently caused by uneven tightening of the bolts (not shown) which secure the stationary sealing cartridge 15 within the stuffing box 12. An equivalent misalignment will occur if the axis of the shaft 14 is not perpendicular to the stuffing box face 20. Either circumstance may produce misalignment represented by the angle $\alpha$ in FIG. 1. When the rotary sealing cartridge 16 is placed on the shaft 14 and its sealing surface 22 is brought into sealing contact with the sealing surface 24 of the stationary sealing cartridge 15, the two surfaces 22 and 24 will tend to align themselves with one another and the rotary sealing cartridge 16 will be secured to shaft 14 by set screws 18 with its axis misaligned by the angle $\beta$ from the axis of the shaft 14, angle $\alpha$ being equal to angle $\alpha$. After installation, and when the rotational speed of shaft 14 increases, centrifugal force will urge rotary sealing cartridge 16 to become axially aligned with shaft 14, as shown in FIG. 2. Now the sealing surface 22 tends to become perpendicular to the axis of shaft 14, while sealing surface 24 remains misaligned. This results in formation of a gap between surfaces 22 and 24 which breaks the seal therebetween, permitting leakage.

Prior art attempts to correct for this misalignment leakage, have resorted to complicated "free-floating" secondary sealing elements (located between the primary seals discussed above) and have suspended the secondary seals with a multitude of coil springs and wave springs to balance the wear on various O-rings. Such a complicated spring and O-ring dependent sealing assembly is shown in the U.S. Pat. No. 3,972,536 to Warner et al, issued Aug. 3, 1976. In contrast, my approach provides a simple, uncomplicated seal assembly which solves the misalignment problem and does not use springs or O-rings.

Figure 3:
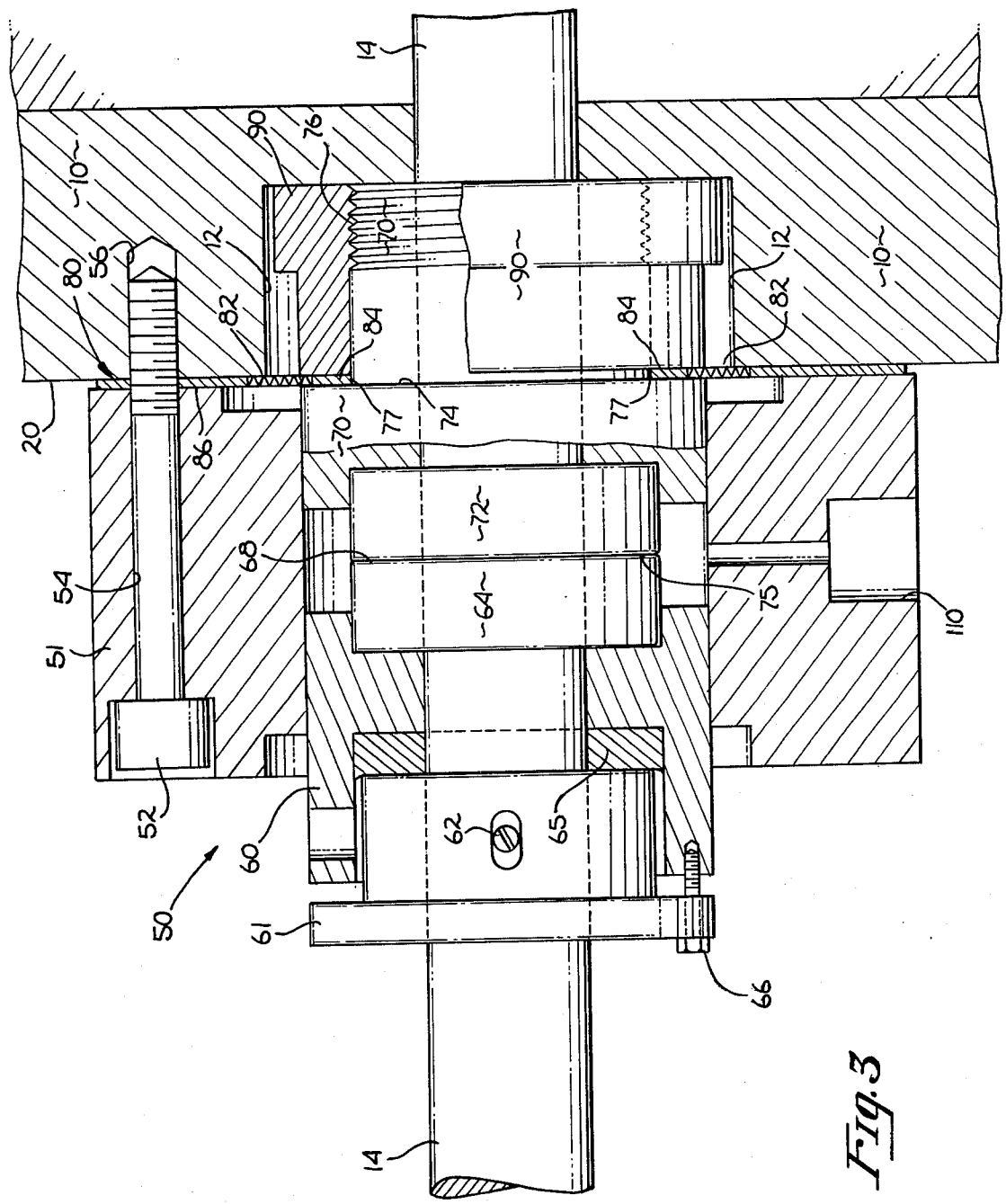
FIG. 3 shows a cross section of the mechanical rotating shaft seal assembly of the present invention.

The seal assembly 50 shown in FIG. 3 is designed to be slipped over a rotatable shaft 14 which penetrates to the interior of a fluid filled container such as a pump. The stuffing box gland 51 is secured to the face 20 of the stuffing box 12 provided in the housing 10 of the pump by bolts 52 passing through the axially extending bolt holes 54 in gland 51 and anchoring in the threaded bolt holes 56 in the face 20.

Figure 4:
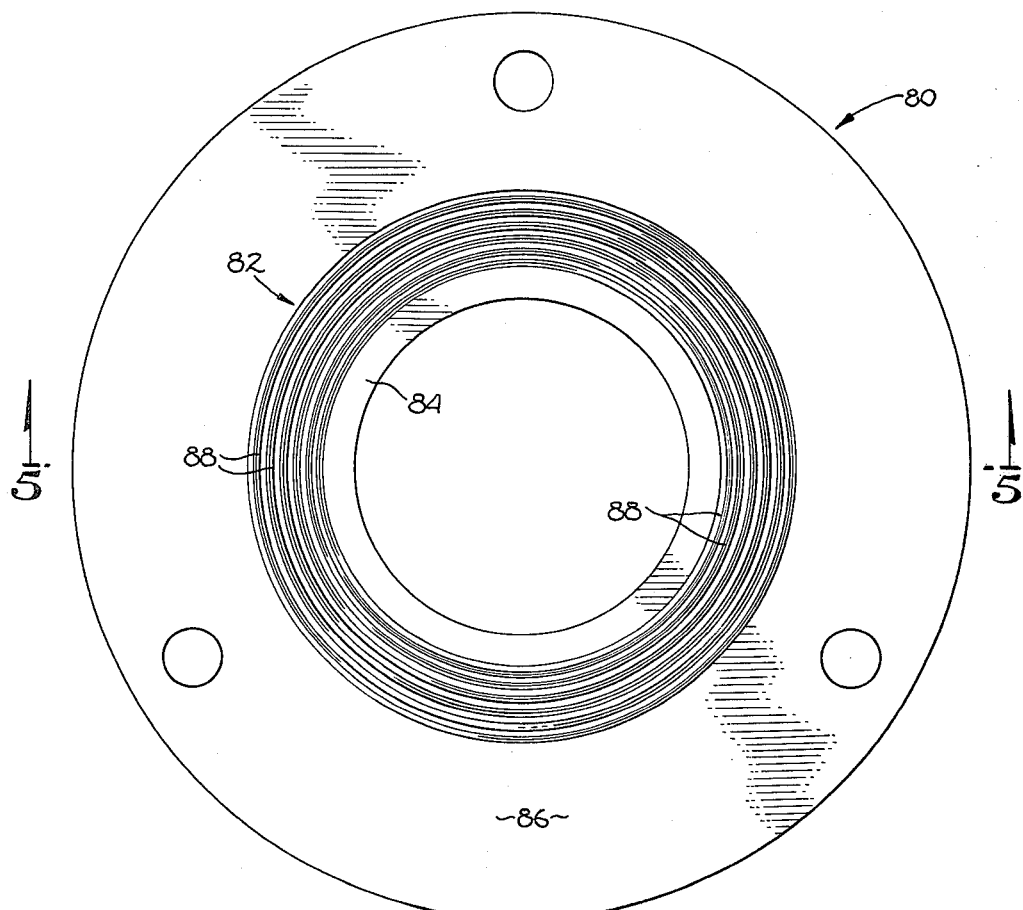
FIG. 4 is a front plan view of the flexible diaphragm member.
Figure 5:
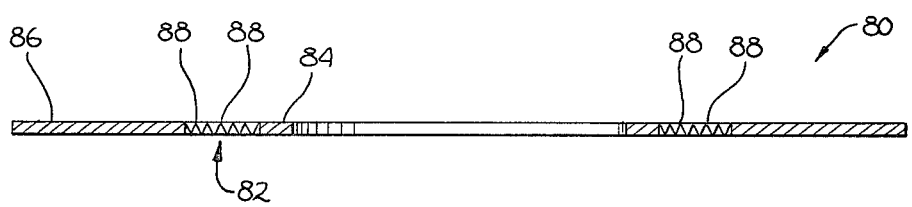
FIG. 5 is a cross section of the diaphragm of FIG. 4.

The rotary sealing cartridge 60 together with its adjustable end piece 61 are secured for rotation with shaft 14 by a locking screw 62, and are provided with a press fit sealing insert 64. The sealing insert 64 (and insert 72 also) is preferably made of a metal such as tungsten carbide though other materials may be used depending on the specific nature of the fluid in the container. The radial "fit" of packing 65 about shaft 14 provides axial shaft sealing and the "fit" may be adjusted by rotation of axial adjustment bolts 66. Sealing insert 64 makes a loose radial fit about shaft 14. The stationary sealing cartridge 70 is secured to and suspended upon a metal diaphragm 80 having a flexible annular region 82 located between an inner annular solid portion 84 and an outer annular solid portion 86. The diaphragm 80, shown in detail in FIGS. 4 and 5, is secured by bolts 52 between the stuffing box gland 51 and the stuffing box face 20 of housing 10. The stationary sealing cartridge 70 is also provided with a press fit sealing insert 72, which remains stationary with respect to the rotating shaft 14. The radially extending surface 74 of the stationary sealing cartridge is affixed to and mounted upon the inner solid portion 84 of the flexible metal diaphragm 80 by the diaphragm locknut 90 which may be advanced over threads 76 of the stationary sealing cartridge 70 to firmly grip the diaphragm 80 between the locknut 90 and shoulder 77 of cartridge 70. The flexibility of the diaphragm 80 allows the alignment of the stationary sealing cartridge 70 to vary and compensate for any axial misalignment between shaft 14 and face 20 or misalignment which would otherwise be introduced by uneven adjustment of bolts 66.

If the axis of shaft 14 is not perpendicular to face 20, the axially extending sealing surface 68 of the rotary sealing insert 64 will not be parallel to face 20. Under such circumstance, if the stationary sealing cartridge 70 and insert 72 were secured with its radially extending surface 75 parallel to face 20 there would be a gap between the surfaces 68 and 75 and the seal would leak and wear unevenly. By mounting stationary sealing cartridge 70 and its insert 72 on the radially inner solid portion 84 of the metal diaphragm 80, the flexible nature of region 82 will allow sealing surface 75 to self-align and become parallel to surface 68 and form a tight seal therewith. This flexing of region 82 thus compensates for the misalignment.

If the misalignment is a result of uneven adjustment of tightening bolts 66 such that sealing surface 68 is not parallel to face 20, the flexible nature of the diaphragm will again allow surface 75 to align with surface 68 to maintain a tight sealing engagement. No gap will form and the surfaces will wear uniformly.

The flexibility of the metal diaphragm 80 is effected by stamping the diaphragm in a punch press to produce a series of concentric "waves" 88 shown in detail in FIGS. 4 and 5. These waves 88 allow the inner solid portion 84 to move with respect to the outer solid portion 86. Thus, the stationary sealing cartridge 70, its sealing insert 72 and the diaphragm locknut 90 are suspended upon the moveable inner solid portion 84 of the diaphragm 80. Ideally the weight of the sealing insert 72, the stationary sealing cartridge 70 and the diaphragm locknut 90 are balanced on each side of the diaphragm so that the plane of the interior solid portion 84 would remain in the plane of the outer solid portion 86 in the absence of any other loading.

Because the stuffing box gland 51 and all the sealing cartridges and sealing inserts are located outside of the pump housing 10, they are free to radiate heat to the atmosphere efficiently. Because of the construction of the seal assembly no heat sensitive coil springs or O-rings are used. The seal assembly is thus suited to high temperature applications and to caustic fluids or fluids that would otherwise clog the seal assemblies of the prior art.

A major advantage of this seal assembly is its operating temperature range of up to 1200 degrees Fahrenheit. This is made possible because the use of the flexible metal diaphragm 80 permits elimination of the temperature limiting coil springs and O-rings used in prior art seal assemblies. To take full advantage of this large temperature range of the seal assembly, the interior of the pump should be of all metal construction.

The material used in manufacturing the diaphragm 80 will vary according to the fluid being pumped. Its thickness is preferably about 0.005 inches, but this also will vary according to the pump pressure and the amount of flexibility desired or required.

Because the secondary packing 65 which effects axial sealing against leakage along the shaft 14, is located on the exterior of the pump, it is easily maintained or replaced. Because it is locked onto the shaft 14 and rotates with the rotary seal cartrdige 60 and shaft 14, there is no need for the use of the conventional shaft sheeve and no fretting of the shaft occurs.

The construction also permits flushing of the seal faces, i.e., surfaces 68 and 75, from the outside through flushing port 110. The flushing fluid will not come in contact with, and will not contaminate the product being pumped, which is an important consideration when dealing with acids and high temperature products.

While the invention has been described with particular reference to FIGS. 1 through 5, it is to be understood that the figures are for purposes of illustration only and should not be interpreted as limitations upon the invention. Many changes and modifications in material and design may be made by one of ordinary skill in the art without departing from the spirit and scope of the invention as set forth in the appended claims.

What I claim is:

1. A mechanical rotating shaft seal assembly comprising a stuffing box gland for receiving a rotary sealing cartridge and a stationary sealing cartridge, and for mounting onto the face of a stuffing box, an axially flexible annular diaphragm member secured between said stuffing box gland and said face and extending radially inwardly to cover a portion of said stuffing box, means for coupling said stationary sealing cartridge to said diaphragm member whereby said stationary sealing cartridge may axially align itself with said rotary sealing cartridge.

2. The seal assembly according to claim 1 wherein said diaphragm comprises a rigid annular radially outer portion rigidly secured between said gland and said face, a flexible annular radially central portion, and a rigid annular radially inner portion, said stationary sealing cartridge being secured to said rigid annular radially inner portion whereby said stationary sealing cartridge is axially moveable with respect to the plane of said rigid radially outer portion of said diaphragm.

3. The seal assembly according to claim 2 wherein said staticnary sealing cartridge is provided with a shoulder, for abutting a first side of said rigid radially inner portion, and an exterior threaded tubular portion passing axially through said diaphragm for threaded engagement with a locknut, advancement of said locknut over said threads clamping said rigid radially inner portion between said shoulder and said locknut.

4. The seal assembly according to claim 3 wherein said diaphragm is formed to have its radially central portion comprised of a plurality of concentric waves of material whereby said rigid radially inner portion is axially moveable with respect to said rigid radially outer portion.

5. The seal assembly according to claim 4 wherein said diaphragm has a thickness of 0.02 inches or less.

6. The seal assembly according to claim 5 wherein said diaphragm is of one piece metal construction.

7. The seal assembly according to claim 1 wherein said sealing cartridges are each provided with a press fit sealing insert and said stuffing box gland is provided with an exterior flushing port for directing flushing fluid to the radially outer surface of said sealing inserts.

8. The seal assembly according to claim 1 wherein the axial position of said rotary sealing cartridge may be adjusted without disassembly of said seal assembly.

9. The seal assembly according to claim 1 wherein said rotary sealing cartridge and said stationary sealing cartridge are mounted on the exterior of said stuffing box with said stationary sealing cartridge extending to the interior of said stuffing box.

10. The seal assembly according to claim 1 wherein said rotary sealing cartridge is provided with packing material to effect axial sealing along said shaft.

* * * * *